March 31, 1942. F. B. DIESBACH 2,278,250
TELESCOPE SUPPORT
Filed June 29, 1938 2 Sheets-Sheet 1

INVENTOR.
BY Frederick B. Diesbach
Wood & Wood ATTORNEYS

March 31, 1942.          F. B. DIESBACH          2,278,250
TELESCOPE SUPPORT
Filed June 29, 1938                2 Sheets-Sheet 2

INVENTOR.
Frederick B. Diesbach
BY Wood & Wood ATTORNEYS.

Patented Mar. 31, 1942

2,278,250

UNITED STATES PATENT OFFICE 2,278,250

TELESCOPE SUPPORT

Frederick B. Diesbach, Hamilton, Ohio, assignor to Paul Benninghofen and Fritz G. Diesbach, both of Hamilton, Ohio, as trustees Application June 29, 1938, Serial No. 216,556

2 Claims. (Cl. 248—183)

This invention relates to collapsible mounting stands for telescopes or similar instruments. More specifically, the present invention is directed to an improved mounting stand which provides for universal sighting movements of the telescope and which includes an adjustable mounting head, adaptable to instruments of various size and diameter.

The improved mounting stand of this invention is designed primarily for "spotting scopes" such as are commonly used on rifle ranges for observing the long range targets without leaving the firing line for a minute inspection. The stand is intended to serve equally well, however, for other instruments, such as portable telescopes for celestial observation or general field use.

In order to permit vertical rocking movements as well as horizontal or panoramic adjustment for locating the object, the telescope mounting head pivots vertically and swivels horizontally and includes locking devices so that the telescope may be trained and focused upon the object and then locked in position.

Since relatively high power telescopes have a narrow field of view, and angular movements of the telescope are greatly magnified making observations difficult if movement is permitted, it is quite necessary that the mounting stand be sufficiently stable to hold the instrument rigidly in adjusted position. It is, therefore, requisite that the adjusting devices with which the stand is equipped be provided with clamping or locking elements which rigidly lock the same and prevent looseness or slippage after adjustments have been made.

The present telescope stand is mounted upon a collapsible tripod, adjustable as to spread to provide a firm support regardless of the weight and size of the telescope. Should it be desirable to raise or lower the head of the stand, an extensible shank is provided on the mounting head which permits it to be moved bodily and clamped in position.

It has been an object of the present invention to provide a collapsible telescope stand having an improved tripod locking arrangement by means of which the legs may be set up and adjusted to obtain any required spread and locked in position to rigidly support the stand.

It has been another object of the invention to provide an improved mounting head which is readily adjustable to fit various sizes of telescopes.

It has been still another object to provide an improved swivel support for the mounting head to facilitate sighting of the telescope and to provide conveniently operated locking devices for securely clamping the head at the selected angle.

Various other objects and advantages will be more fully set forth in the specification with reference to the accompanying drawings in which.

Figure 1:
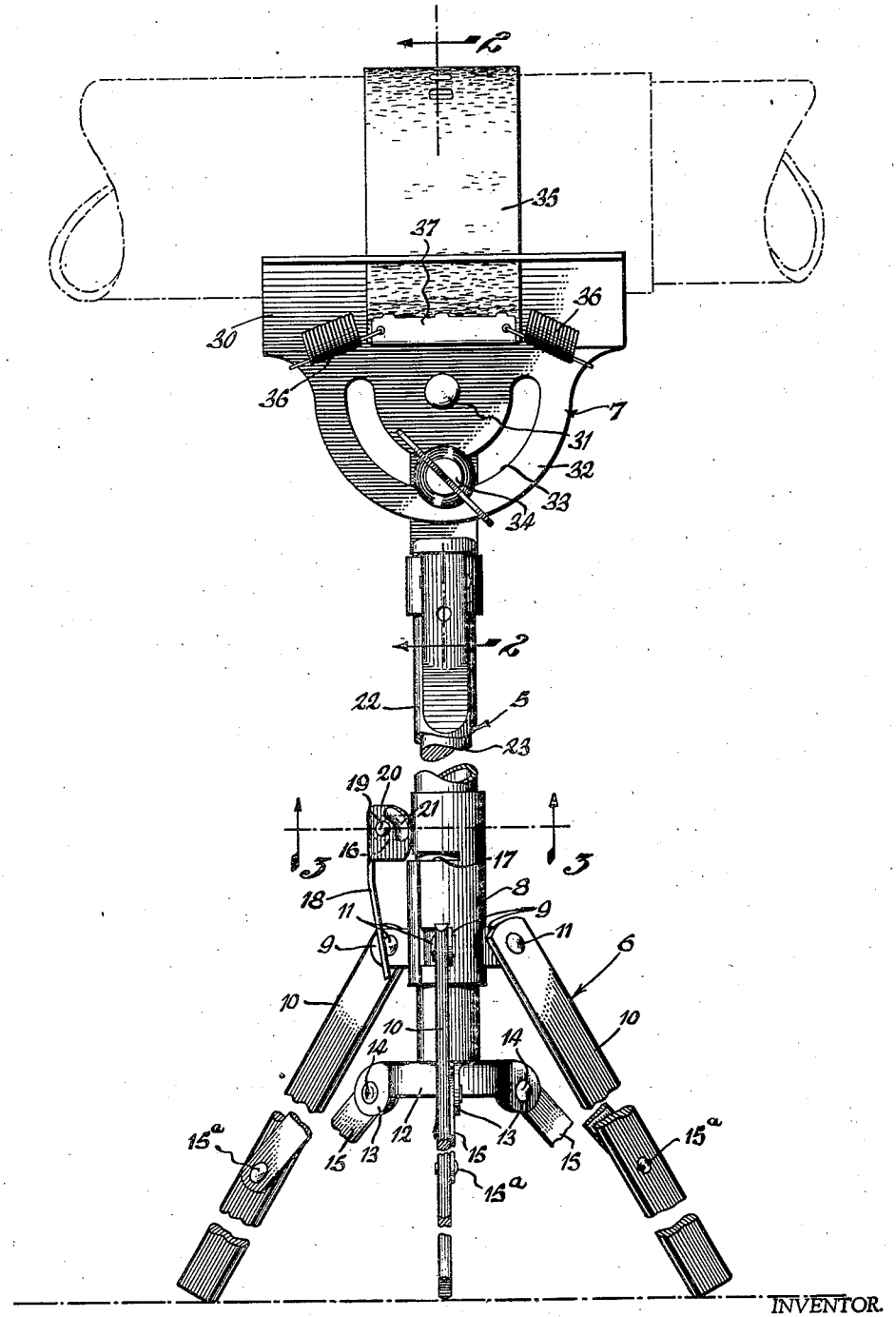
Figure 1 is a side elevation of the improved telescope tripod or stand in set-up position with portions broken away to shorten the view.
Figure 2:
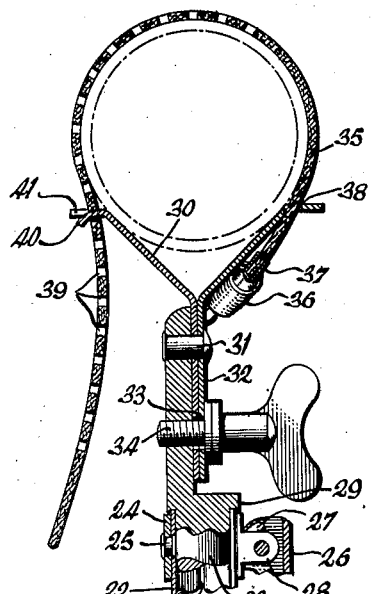
Figure 2 is a sectional view taken on line 2—2, Figure 1, detailing the head of the stand.

Referring now to the drawings, the tubular post or standard is indicated at 5, the tripod generally at 6, and the telescope mounting head or cradle generally at 7.

The tripod leg arrangement at the lower end of the post is constructed in the following manner. A sleeve or carrier 8 having three radial ears 9 is slidably mounted on the post 5. The upper ends of the respective legs or props 10 are pivotally attached to these ears by means of rivets 11. The lower end of the post 5 is provided with a collar 12 welded or otherwise attached thereto, and likewise provided with three radial ears 13 to which are pivoted, as at 14, the upper ends of respective leg braces or links 15.

The lower ends of the braces 15 are pivoted as at 15ª, medially the length of the legs to sustain the legs according to the position of the slidable sleeve 8. The sleeve slides smoothly over the post 5; therefore, movement of the sleeve or the legs simultaneously sets-up or collapses the legs.

A clamping device is provided for clamping the tripod legs either in collapsed position, or in set-up position, or if desired, in any adjustment between the two extreme positions. The clamping device is detailed in Figures 3 and 4. It will be noted that the upper portion of the sleeve 8 is slotted longitudinally and a pair of ears 16 are bent outwardly from the body of the sleeve at each side of the slot. The longitudinal slot is joined by a circumferential split 17 extending partially around the sleeve. This split provides a flexible upper sleeve portion encircling the post and separated from the lower sleeve portion by the split 17.

The flexible portion of the sleeve is compressed or released by means of a clamping finger 18 pivoted upon the pin 19 extended between the ears 16.

Figure 3:
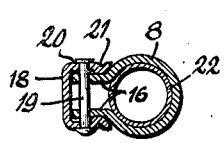
Figure 3 is a sectional view taken on line 3—3, Figure 1, detailing the clamping or locking device for securing the tripod in position or securing the head in position on the stand.
Figure 4:
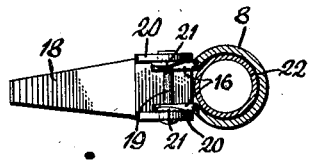
Figure 4 is a sectional view similar to Figure 3 showing the clamping device in unclamping or released position.
Figure 5:
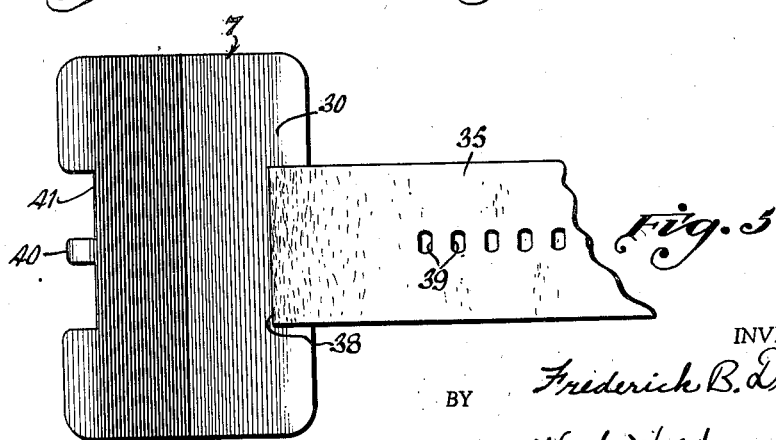
Figure 5 is a top plan view illustrating the structure of the head.

The upper portion of the clamping finger is U-shaped as shown in Figures 3 and 4 constituting a pair of side flanges 20 between which the ears 16 are disposed. The side flanges each include an inclined cam 21 formed by pressing an arcuate rib inwardly of the flange. The arcuate cam or rib is formed on a radius the center of which coincides with the pin 19. Each cam or rib increases in height arcuately or slants from the lower to the upper end and each is in contact with a respective ear 16. Therefore, when the clamping finger is moved from the raised or unclamping position to clamping position, the cams or ribs 21 draw the ears together and the flexible sleeve portion into clamping engagement with the post. The tripod legs in this manner may be clamped or locked in any desired position.

The upper end of the tubular post is provided with a scope support head which provides a universal mounting for the telescope. This head, indicated generally at 7, is fixed upon the upper end of a post 23 rotatably and telescopically journalled in the upper end of the main post section 22. The upper end of the post is longitudinally slotted as at 22ª and the slotted portion encircled by a clamped ring 24 secured thereto by a rivet 25. The clamping ring is of the same construction as the slidable tripod sleeve 8 previously described, and is operated by a clamping finger 26 provided with cams or ribs 27 and pivoted upon a pair of ears 28. The post 23 includes a shoulder 29 in bearing contact with the upper edge of the post for supporting the rod and permitting it to be freely swiveled when the clamping finger 26 is released.

The cradle 30 into which the telescope is clamped comprises a V-shaped trough pivotally mounted upon the flattened upper end of the shaft 23 by means of the rivet 31. The depending pivoted portion of the cradle comprises a quadrant 32 having an arcuate slot 33 traversed by a wing bolt 34 screwthreaded into the post 23 for locking the cradle in adjusted position. The cradle by this arrangement may be rocked vertically within the limits of the slot 33 and locked in adjustment by the wing bolt 34. The rotative mounting of the post 23 permits horizontal or panoramic movements of the head.

The telescope is secured in the cradle by means of a strap 35. This strap is secured at one end to the cradle and arranged to be looped over the telescope and fastened on the opposite side of the cradle. The strap is secured to the cradle by means of a pair of coil springs 36 anchored at one end to the depending end of the trough. The opposite ends of the springs are secured to the strap by means of a clamping plate 37 clinched to the end of the strap and having apertures for engagement of the upper terminals of the springs. The trough is provided with a slot 38 through which the strap is slidingly drawn, the springs 36 providing the necessary yieldability to frictionally grip the barrel of the telescope.

The free end of the strap is provided with a series of apertures 39 centrally thereof engageable with a hook or tongue 40 projecting centrally from the back edge of a notch 41 in the opposite upper edge of the cradle. The apertures 39 and the tongue 40 provide an adjustable strap and buckle engagement suitable for telescopes of various diameters. In securing the instrument, the strap is looped thereover, aligned in the notch 41 and pulled taut and engaged over the tongue 40. The action of the springs facilitates adjustment of the strap while the notch 41 aligns the apertures 39 with the tongue 40 so that it catches the nearest aperture after the strap is pulled tight then released slightly.

After the telescope is mounted in the cradle, it may be swung to any desired angle by means of the universal mounting, then locked in position by means of the wing bolt 34 and the clamping finger 26. The height of the telescope may also be adjusted vertically if this is required, by partially withdrawing the post 23 from the tubular post section 22 and clamping it in elevated position by means of the clamping finger 26. Normally, however, the shaft is freely swiveled and supported by the shoulder 29 when the clamping finger is in released position.

The flexibility of the tripod renders it ideal for use on target ranges as a stand for spotting scopes which are trained on the target for locating the hits. Although designed especially for this purpose, the stand is quite adaptable to telescopes for other uses such as astronomical telescopes or telescopes for general observation work. As indicated above, the clamping head or cradle may be adjusted to accommodate virtually any standard telescope regardless of diameter. In order to provide against tipping of the stand when longer and heavier instruments are mounted, the tripod legs may be adjusted for a greater spread to form a broader and more stable base. This may be accomplished by adjusting the sleeve 8 vertically relative to the post to the desired point as previously pointed out. Should this adjustment lower the telescope too greatly, the shaft 23 can be drawn upwardly and clamped to support the telescope at the proper level.

When not in use, the stand may be collapsed by folding the tripod legs upwardly to lie against the post or standard. In folded or collapsed position the stand forms a compact unit from which the telescope may be removed. It is not necessary, however, to remove the telescope and in many instances the stand is simply collapsed and folded against the telescope. This may be done by loosening the wing bolt 34 and swinging the collapsed stand against or parallel with the telescope and then tightening the wing nut to clamp the head in position.

Having described my invention, I claim:

1. A collapsible mounting stand for a telescope or the like, comprising: a supporting post including a base, a head on said post, said head rotatively and tiltably adjustable, means for securing the head in adjusted position, a yieldable cradle for receiving the telescope, and a strap associated with the cradle for fastening the telescope therein.

2. A supporting stand for a telescope or the like, comprising a supporting post including a base, a head for said post, said head adjustable rotatably, a cradle form of support pivotally mounted on said head, means for securing said cradle form of support in adjusted position, and a strap secured to one side of the cradle by means of coil springs, said strap including a series of apertures and the other side of the cradle including a prong over which the strap is adapted to be engaged by engagement of a selected aperture therewith.

FREDERICK B. DIESBACH.